United States Patent [19]

Ueno

[11] Patent Number: 4,598,608
[45] Date of Patent: Jul. 8, 1986

[54] GEAR CRANK FOR A BICYCLE

[75] Inventor: Tadashi Ueno, Sakai, Japan

[73] Assignee: Shimano Industrial Company Limited, Osaka, Japan

[21] Appl. No.: 231,855

[22] Filed: Feb. 5, 1981

[30] Foreign Application Priority Data

Feb. 13, 1980 [JP] Japan .................. 55-17289[U]

[51] Int. Cl.$^4$ .............. G05G 1/14; F16H 55/12; F16H 55/06
[52] U.S. Cl. ...................... 74/594.2; 474/160; 474/162; 74/448
[58] Field of Search ............ 74/594.2, 439, 446, 74/447, 448; 474/158, 160, 162, 164

[56] References Cited

U.S. PATENT DOCUMENTS

| | | | |
|---|---|---|---|
| 1,115,557 | 11/1914 | Livermore | 74/439 |
| 4,009,621 | 3/1977 | Segawa | 74/594.2 |
| 4,181,033 | 1/1980 | Nagano | 474/160 |
| 4,384,865 | 5/1983 | Ueno | 474/160 |

FOREIGN PATENT DOCUMENTS

| | | |
|---|---|---|
| 0008851 | 3/1980 | European Pat. Off. |
| 2005779 | 4/1979 | United Kingdom |
| 2005778 | 4/1979 | United Kingdom |

*Primary Examiner*—Gary L. Smith
*Assistant Examiner*—Vinh Luong
*Attorney, Agent, or Firm*—Stevens, Davis, Miller & Mosher

[57] ABSTRACT

A gear crank for a bicycle, which comprises a plurality of chain gears and a pair of crank arms, in which some teeth of a larger diameter chain gear among the chain gears are positioned within a range of its center angles of 30° and 60°, forward and rearward respectively in the driving revolution direction of each crank arm at both circumferential sides of a portion at the larger diameter chain gear. The portion corresponding to each crank arm, and the teeth are formed of a material superior to the material of the chain gear body in rigidity, the rigid teeth being formed for easily engaging with a driving chain.

7 Claims, 6 Drawing Figures

GEAR CRANK FOR A BICYCLE

FIELD OF THE INVENTION

This invention relates to a gear crank for a bicycle, and more particularly to a gear crank comprising two or more chain gears of different diameters, a crank shaft supporting the chain gears, and a crank means having a pair of crank arms.

BACKGROUND OF THE INVENTION

Generally, a gear crank uses one front chain gear, but, as is well-known, may use two or more front chain gears having a different number of teeth. A derailleur switches a driving chain to a desired chain gear, so that the driving force from pedalling is transmitted to a rear chain gear at a rear wheel hub of the bicycle at a given gear ratio for changing speed.

The front chain gear incorporated with a crank means is formed of a lightweight material such as aluminum. It is made of lightweight material because it has more teeth than those of the rear chain gear and is inherently larger in diameter and in weight than the rear chain gear so that the lightweight material serves to reduce overall weight.

Such lightweight material is less rigid and has a problem with wear-resistance. Therefore, when two or more chain gears formed of the lightweight material are assembled into a multi-stage chain gear and incorporated with the crank means, teeth of the gears wear out or are broken while changing speed, making durability of the teeth a problem.

When the multi-stage chain gear switches the chain from a smaller diameter chain gear to a larger diameter one, a tooth thereof adjacent to a chain catching tooth and rearward thereof in the rotation direction of the larger diameter chain gear, contacts with the chain travelling slantwise. The chain, when switched from the larger diameter chain gear to the smaller diameter one, contacts in a twisting manner with a tooth adjacent to a chain disengaging tooth of the larger diameter chain gear and forward of the disengaging tooth in the direction of rotation. Hence, these adjacent teeth are subjected to a considerable load resulting in wearing or breaking of the teeth.

The above problem may be solved by using chain gears formed of a material, such as iron, superior in rigidity and wear-resistance to thereby improve its durability. Such chain gears, however, become not only larger in weight but also expensive to produce and are still defective, not withstanding having the advantage of the use of lightweight material.

The inventor has proposed, in U.S. Pat. No. 54,910, a chain gear which is formed of a lightweight material and omits some teeth, so that a toothed member formed of a material, such as iron, superior in rigidity and wear-resistance, is fitted into the teeth-omitted portion. The teeth-omitted portion is provided not for all the teeth but for some teeth likely to catch the chain when switched.

The aforesaid teeth likely to catch the chain, are located at a position coincident with the engaging point of the chain where the chain engages the teeth of the larger diameter chain gear when switched from the smaller diameter chain gear to the larger diameter one. The engaging position is located at a distance from the point where the chain begins to disengage from the smaller diameter gear equal to an integer multiple of the chain pitch. In this instance, the positional relationship between teeth of both the chain gears is changed due to the different number of teeth of each, whereby the point which engages with the larger diameter chain gear when the chain is moved thereto may or may not engage the tips of teeth of the larger diameter chain gear.

The chain has many opportunities of being switched by teeth of the toothed member located at the position where the teeth easily engages the chain, but the chain is not assured of engaging the teeth of the toothed member. Hence, the chain may engage with teeth integral with the chain gear body formed from a lightweight material. The problem of wearing or breakdown of the teeth is not therefore solved.

SUMMARY OF THE INVENTION

An object of the invention is to provide a gear crank which is light in weight and has improved durability, whereby the problem, not completely solved by the previous invention, causing wearing or breakdown of the chain gear teeth can be substantially solved.

Generally, the gear crank comprising the chain gears and crank means, generates a driving force by pedalling, which is transmitted to the rear chain gear through a driving chain. In this instance, the driving force becomes minimum when the crank arms are substantially vertical, i.e., in proximity to the dead points thereof, and the chain is subjected to a minimum load. On the other hand, a front derailleur is provided above a crank shaft, in proximity to the upper dead point of the crank arm, so that the chain is biased by the derailleur chain guide axially of the chain gear. As a result, the chain is switched in proximity to the upper dead point where a minimum load is applied to the chain.

The inventor has observed the above circumstances and found, that the chain is switched in a range of 30 degrees forward in the driving revolution direction of each crank arm and 60 degrees rearward in the same direction at the both sides of the upper dead point of each crank.

Therefore, the invention has been so designed that teeth of the larger diameter chain gear within the aforesaid range are formed of a rigid material to thereby prevent the teeth from wearing or being broken when the chain is switched from the smaller diameter chain gear to the larger diameter one and vice versa.

This invention is characterized in that teeth of the larger diameter chain gear, which are positioned in a range of 30° forward in the driving rotation direction of each crank arm and 60° rearward in the same direction, at both circumferential sides of the point corresponding to the dead point of each crank arm, are formed from a material superior in rigidity to the material of the chain gear body, the rigid teeth being formed for easily engaging with the chain.

The rigid teeth are provided mainly at a tooth member formed of a rigid material, and the chain gear body is partially cut out, so that the toothed member is fit into the cutout portion. All the teeth of the larger diameter chain gear within the above range may be formed of a rigid material, but a plurality of teeth among the teeth within the aforesaid range are formed of a rigid material with a plurality of the residual teeth formed integral with the chain gear body. The residual teeth are formed for easily disengaging from the chain.

The teeth formed for easy engagement with the chain, as described hereinafter, are slanted at the tips with respect to the center line of thickness of the teeth, or shifted at the tips toward the smaller diameter chain gear, so that the chain, when switched from the smaller diameter chain gear to the larger diameter one, more readily engages with the easily engaged type teeth than with others.

The teeth for easily disengaging the chain are cut at the tips to reduce the height of the teeth or shift the tips away from the smaller diameter chain gear, so that the chain, when switched from the larger diameter chain gear to the smaller diameter one, disengages from the easily disengaged teeth more easily than others.

The invention provides the rigid teeth within the aforesaid range, the rigid teeth being formed for easily engaging the chain, or for easily disengaging from the chain, so that the chain may be switched positively within the above range. As a result, the chain is surely switched at the teeth within the above range, but not at teeth outside of the range formed of the same material as the chain gear body. Therefore, the problem of wearing or breakdown of the teeth is overcome and the chain gear can be reduced in weight. The teeth within the aforesaid range, which are formed for easy engagement or easy disengagement, enable the chain to be quickly and exactly switched, whereby the gear crank of the invention has an improved speed change efficiency.

Other features and advantages of the invention will be apparent from the following description taken in connection with accompanying drawings, in which:

DETAILED DESCRIPTION OF THE INVENTION

Figure 1:
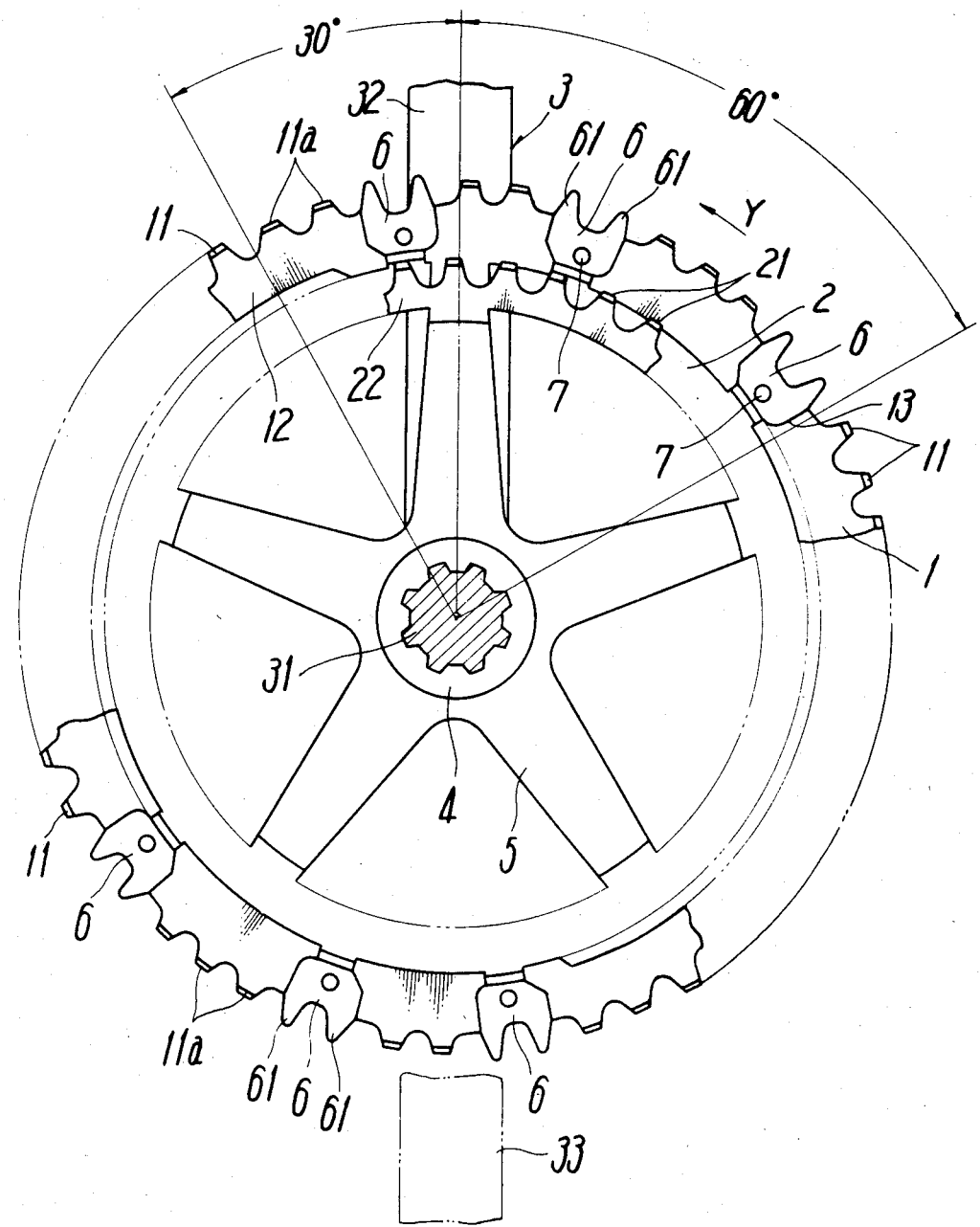
FIG. 1 is a partially cutaway side view of an embodiment of a gear crank of the invention.

Referring now to the figures, a gear crank of the invention comprises a plurality of chain gears 1 and 2 having different diameters and a crank means 3 supporting the chain gears 1 and 2. A larger diameter chain gear 1 having a larger number of teeth and a smaller diameter chain gear 2 having a smaller number of teeth, are supported to a crank shaft 31 axially in parallel at a regular interval.

The chain gears 1 and 2 comprise a large number of teeth 11 and 21 and annular bodies 12 and 22 having at the outer peripheries thereof the teeth 11 and 21 respectively. The bodies 12 and 22 are connected to a boss 4 having an insertion bore for the crank shaft 31, through a plurality of connecting bars 5 extending radially from the boss 4. The chain gears 1 and 2, boss 4 and connecting bars 5, are formed mainly of a lightweight material, such as an aluminum alloy, and molded integrally with each other by die casting.

In addition, the chain gears 1 and 2 integral with boss 4 and connecting bars 5, are easily machined. Alternatively they may be separate, so that the bodies 12 and 22 are fixed to the connecting bars 5 through fixing means, such as screws.

The crank means 3, as is well-known, comprises the crank shaft 31 and a pair of crank arms 32 and 33 fixed to both axial ends of crank shaft 31. The crank arms 32 and 33 are displaced at an angle of 180°, extend radially outwardly from the crank shaft 31, and provide pedals (not shown) at the utmost ends respectively.

The crank arms 32 and 33 may be integral with the crank shaft 31, but are almost separate therefrom and spline-connected with both axial ends of crank shaft 31 and fixed thereto by fixing means, such as bolts or nuts.

The boss 4 of chain gears 1 and 2, when the crank arms 32 and 33 are integral with crank shaft 31, is fixed thereto through a connecting portion fromed at the crank arms 32 or 33, and when the crank arms 32 and 33 are separate from the crank shaft 31, the boss 4 is spline-connected with crank shaft 31 and fixed thereto together with the crank arm 32 or 33.

The gear crank constructed as foregoing is well-known, which will be understandable by those skilled in the art without any detailed description.

This invention is so designed that a larger diameter chain gear 1 at the gear crank constructed as foregoing has some teeth among a number of teeth 11 of the chain gear 1, which are located within a certain range to be hereinafter described. The teeth are partially or wholly formed of a rigid material, such as iron, superior in rigidity to the lightweight material of body 12. The rigid teeth are formed for easily engaging with a driving chain.

The aforesaid range, as shown in FIG. 1, includes an angle of 30°, preferably 15°, of chain gear 1 forward as measured from the respective crank arms 32 and 33 in the driving rotation direction and 60° to the rear of the crank arms in the same direction at both circumferential sides of a point at chain gear 1 corresponding to the respective crank arms 32 and 33. The point is coincident with the dead point where the crank arms 32 and 33 are each positioned vertically so that a driving force from pedalling becomes minimum.

Within the aforesaid range across both sides of the upper or lower dead point, the pedalling is lessened to reduce the driving force which is transmitted to the chain from the teeth positioned within the aforesaid range. Therefore, since a front derailleur is provided in proximity to the upper dead point, when the gear teeth within the range arrive at the position corresponding to the derailleur, and in turn, to the chain biased for shifting by a derailleur, chain guide the chain can easily be switched regardless of any speed changing condition.

To be more concise, teeth positioned within the aforesaid range are omitted from the body 12, and the body 12 is cut out at a side facing the smaller diameter chain gear 2 to a given depth radially inward from the outer periphery of body 12, thus forming a toothed member mounting portion 13. A toothed member 6 formed made from a rigid material having rigid teeth of the same number as those teeth omitted, is fit into the mounting portion 13 and fixed thereto by fixing means 7, such as screws.

Referring to FIG. 1, six among the thirteen teeth positioned within the aforesaid range are omitted on each side in pairs spaced by two or three teeth, so that three toothed members each having two rigid teeth 61 are fixed on the teeth-omitted portions respectively, the rigid teeth 61 each being formed for easy engagement with the chain, and seven residual teeth 11a on each side of the gear 1 are formed for easy disengagement from the chain.

Alternatively, all the teeth within the range may be rigid teeth 61, or a plurality of toothed members 6 each having two or more rigid teeth 61 may be mounted on the body 12 spaced by two or three teeth.

Figure 2:
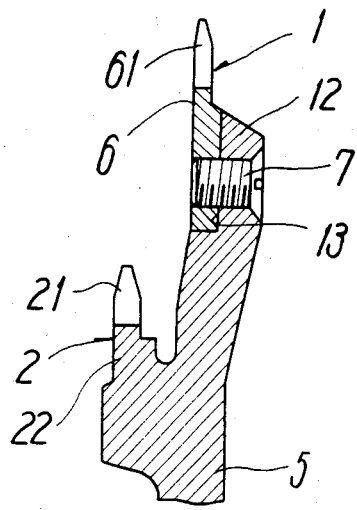
FIG. 2 is an enlarged longitudinally sectional view of a principal portion of the FIG. 1 embodiment.
Figures 3, 4, 5, 6:
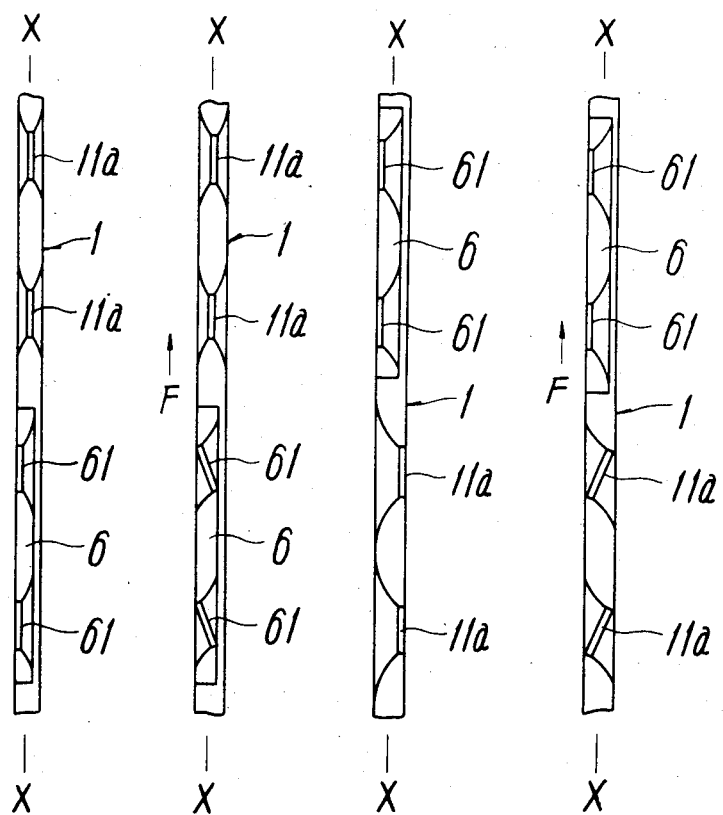
FIG. 3 is an enlarged plan view of a part of a larger diameter chain gear.
FIGS. 4 through 6 are partially enlarged plan views of modified embodiments of the larger diameter chain gear.

The rigid teeth 61 of the easy engagement type at the larger diameter chain gear 1, as shown in FIGS. 2 and 3, are made smaller in thickness than teeth 11 out of the range and shifted toward the smaller diameter chain gear 2 with respect to the center line X—X of thickness of the teeth, so that the chain easily engages with the rigid teeth 61 when switched from the smaller diameter chain gear 2 to the larger diameter one 1.

Alternatively, the rigid teeth 61 of the easily engaging type, as shown in FIG. 4, may be slanted at the tips with respect to the center line X—X of thickness of the teeth in the full range of thickness thereof so that the front ends in the driving rotation direction F of the chain gear body are slanted toward the smaller diameter chain gear 2. In this instance, it is more effective to project the front ends outwardly from the lateral side of chain gear 1. Furthermore, the teeth 61 shown in FIG. 3 may alternatively project toward the smaller diameter chain gear 2 outwardly from the opposite side of chain gear 1.

The residual teeth 11a formed for easily disengaging from the chain, as shown in FIG. 1, are reduced in height, which may alternatively be displaced at the tips away from the chain gear 2 with respect to the center line X—X of thickness of the teeth in the full range of thickness thereof as shown in FIG. 5, or may be slanted at the tips with respect to the aforesaid center line X—X so that the front ends in the driving rotation direction of chain gear 1 are slanted away from the smaller diameter chain gear 2 as shown in FIG. 6.

The teeth 11 of chain gear 1 positioned out of the aforesaid range are formed not in the engaging or disengaging type, but in the usual type, so that the tips of teeth are aligned with the center line X—X of thickness of the teeth and the teeth have the usual height. These teeth switch the chain with difficulty in comparison with the teeth within the range. The reason for this is that the teeth 11 not only have the usual form but also transmit a larger driving force to the chain when they are correspondingly positioned with the derailleur, whereby a greater load affects a switching of the chain.

In the gear crank of the invention constructed as aforementioned, when the chain is switched from the smaller diameter chain gear 2 to the larger diameter one 1, the front derailleur provided vertically above the crank shaft 31 is operated to bias and shift the chain by the chain guide toward the larger diameter chain gear 1, so that the chain is switched from the smaller diameter chain gear 2 to the larger diameter one 1, at which time the crank arms 32 and 33 rotate by pedalling while the chain is travelling. When the crank arms 32 and 33 are turned vertical by pedalling to the upper and lower dead points, the rigid teeth 61 within the aforesaid range correspond with the chain shifted by the chain guide.

In other words, at the upper dead point where the minimum driving force from the minimum pedalling is transmitted to the chain from the teeth 11 or 21 of chain gear 1 or 2, the rigid teeth 61 within the range correspond with the chain shifted by the chain guide.

Therefore, the chain subjected to a light load can be shifted near the upper dead point of crank arm 32. Also, the rigid teeth 61, which are formed for easily engaging, can quickly engage with the chain so that the chain is switched to the larger diameter chain gear 1.

At this time, a rigid tooth 61, if positioned adjacently to a first chain catching rigid tooth 61 and rearward thereof in the rotation direction (the arrow Y direction in FIG. 1) of chain gear 1, is not broken even when subjected to a load from the chain. On the other hand, if a tooth 11a not rigid but of the easily engaging type is positioned in the same manner as the above, a load from the chain is not concentrated on the tooth 11a due to the fact that the tooth 11a reduces the height thereof, or the front end of its tip in the rotation direction of chain gear 1 is slanted away from the smaller diameter chain gear 2. As a result, the tooth 11a is prevented from being broken. In addition, it is of course more effective to form all the teeth within the range into toothed members 4 made from a rigid material.

The chain, when switched from the larger diameter chain gear 1 to the smaller diameter chain gear 2, is shifted toward the chain gear 2 similar to the former case, so that the rigid teeth 61 and the teeth 11a of the easily disengaging type within the aforesaid range, when the crank arms 32 and 33 reach their dead points, correspond with the chain guided by the chain guide. Therefore, the chain is shifted under a light load similar to in the former case and easily disengages from the teeth 11a, thus being switched to the smaller diameter chain gear 2.

At this time, a rigid tooth 61, if positioned adjacently to the chain disengaging tooth 11a and forward thereof in the rotation direction of chain gear 1, doesn't break even when subjected to the load from the chain. Also, a tooth just before the tooth 11a in the same direction, if formed for easily disengaging, is prevented from breaking down even when formed of the same material as the body 12.

In addition, it is of course effective if all the teeth within the aforesaid range are formed of a rigid material, and a plurality of teeth among the rigid teeth are formed for easily engaging with the chain and a plurality of the residual teeth are formed for easily disengaging from the chain.

As seen from the above, the gear crank of the invention provides that the chain gears be formed from a lightweight material, such as aluminum, and also overcomes the problem of wearing or breaking of the teeth at the larger diameter chain gear when the chain is switched. Therefore, the gear crank of the invention can meet the requirement of producing a bicycle light in weight.

As many widely different embodiments of this invention may be made without departing from the spirit and scope thereof, it is to be understood that the invention is not limited to the specific embodiment except as defined in the appended claims.

What is claimed is:

1. A gear crank for a bicycle, comprising a plurality of chain gears each having a body formed of a lightweight material, and a large number of teeth, said gears having different diameters; a crank shaft supporting said chain gears; and a crank means including a pair of crank arms, one of said gears being a larger diameter chain gear which has predetermined peripheral teeth formed of a more rigid material than the material of the body of said larger diameter chain gear and the remaining teeth of said larger diameter chain gear, said predetermined teeth being positioned within a range including a 30° sector angle of said larger diameter chain gear in a forward driving rotation direction from each of said crank arms, and a 60° sector angle of said larger diameter chain gear rearward in the same direction from each of said crank arms, said sector angles lying at both circumferential sides of said larger diameter chain gear, said crank arms lying within said range, said predetermined teeth being formed as easy engagement teeth for easily engaging with a driving chain as compared with the remaining teeth of said larger diameter chain gear.

2. A gear crank for a bicycle according to claim 1, wherein said remaining teeth are formed for easily disengaging from the chain.

3. A gear crank for a bicycle according to claim 1, wherein said remaining teeth within said range are integral with the body of said larger diameter chain gear and formed for easily disengaging from the chain.

4. A gear crank for a bicycle according to claim 3, wherein a plurality of sets of teeth, each of a plurality having said rigid teeth are incorporated with said larger diameter chain gear within said range thereof.

5. A gear crank for a bicycle according to claim 3, wherein said rigid teeth comprise a toothed member having sets of a plurality of teeth, each of said sets of a plurality of teeth being incorporated with said larger diameter chain gear within said range thereof and separated by two of said easily disengaging type of teeth.

6. A gear crank for a bicycle according to claim 3, wherein said rigid teeth comprise a toothed member of having sets of a plurality of teeth, each of said sets of a plurality of teeth being incorporated with said larger diameter chain gear within said range thereof and separated by three of said easily disengaging type teeth.

* * * * *